United States Patent [19]

White

[11] 4,040,103
[45] Aug. 2, 1977

[54] SHOCK FORCE COMPENSATING SYSTEM

[75] Inventor: Robert A. White, Bloomington, Minn.

[73] Assignee: Sperry Rand Corporation, New York, N.Y.

[21] Appl. No.: 655,588

[22] Filed: Feb. 5, 1976

[51] Int. Cl.² .......................... G11B 21/20; G11B 5/60
[52] U.S. Cl. ...................................................... 360/75
[58] Field of Search ................................. 360/75, 103

[56] References Cited

U.S. PATENT DOCUMENTS

| 3,503,056 | 3/1970 | Vos | 360/75 |
| 3,632,900 | 1/1972 | Kurzweil et al. | 360/75 |

*Primary Examiner*—Robert S. Tupper

*Attorney, Agent, or Firm*—John B. Sowell; Thomas J. Nikolai; Marshall M. Truex

[57] ABSTRACT

A system for compensating for shock force induced movement of a flying magnetic head which is positioned juxtaposed a rotating magnetic device. A chassis for supporting a rotating magnetic device and a flying head is mounted on shock absorbers to attenuate and delay externally imposed shock forces. An accelerometer is mounted on a fixed base of the system and receives the undelayed shock force and provides an output signal indicative of the magnitude and direction of the shock force being applied to the system. The undelayed output signal on the accelerometer is applied to transducer means which move the flying head away from or toward the magnetic device in anticipation of the shock force disturbing the gap between the flying head and the rotating magnetic device.

9 Claims, 2 Drawing Figures

SHOCK FORCE COMPENSATING SYSTEM

BACKGROUND OF THE INVENTION

1. Field of the Invention

This invention relates to a magnetic memory device of the type employed with electronic data processing equipment. More particularly this invention relates to means and a method for compensating a magnetic memory device against interruptions caused by external shock forces.

Heretofore, magnetic memory devices such as a disk file system or a drum system have been mounted on shock absorbers and resilient supports in order to damp out shock vibrations. the shock absorbers of the prior art type have been found to provide sufficient damping to avoid interruptions and malfunctions in most industrial applications where shock forces up to several times the force of gravity have been encountered.

When an externally applied shock force exceeds thirty times the force of gravity the ability of a well-built shock absorber to protect the drum or disk magnetic memory device becomes questionable. If a shock force is applied repeatedly or periodically to a system the shock forces build up due to resonant vibration.

2. Description of the Prior Art

Heretofore, prior art rotatable magnetic storage devices were not provided with impact shock compensating systems.

Prior art magnetic storage devices are known to be mounted on shock absorbing means to reduce and attenduate impact shock forces. Shock absorbers do not compensate for impact shock forces, but merely reduce the force transmitted through the shock absorber.

When a magnetic storage device is distrurbed by impact forces sufficient to cause to gap or space between the flying head and the magnetic device to change, the head may crash into the magnetic device cuasing permanent damage to the magnetic medium and/or the flying head. Often such damage results in the destruction of information stored in the magnetic media and/or can destroy the usefulness of the magnetic storage device.

When a disturbance causes a magnetic head to move away from the magnetic media during active operation, information may not be properly written in or read out of the magnetic media. The usefulness of the magnetic storage system may be interrupted to the extent as to cause a subsequent malfunction or error.

To minimize the damage caused by flying heads crashing into a rotating magnetic media, protective plastic coatings have been applied over the magnetic media to protect the magnetic coating. Some prior art magnetic media comprises a homogeneous tough plastic impregnated with magnetic particles. While such homogeneous magnetic media offers some protection against heads which crash into the plastic they do not permit the more advanced flying heads to generate high density recording data.

U.S. Pat. No. 3,913,138 shows and describes a flying magnetic head capable of flying about ten to twenty microinches above a magnetic disk. Such a low flying heads are most prone to crash because the layer between the head and the disk has been reduced to a minimum. When the externally applied shock impact forces are sufficient to create undulations in the rotating disk the gap between the head and the disk is both increased and decreased during a single revolution of the disk and the chances of a crash occurring are increased.

Prior art flying heads which have a high mass are usually biased downward by spring pressure toward the magnetic media to cause the head to fly in the laminar layer of air on the surface of the disk. High mass heads cannot be maintained at the same gap distance above a disk when the impact force causes an undulation of the disk which exceeds the gap distance.

SUMMARY OF THE INVENTION

The present invention provides a solution to the problems of the prior art where impact forces have caused flying heads to crash, have caused improper data to be read or recorded, and have caused rotary magnetic storage devices to malfunction and/or cease operation.

The system of the present invention may be implemented as an addition to existing rotating magnetic memory storage systems without the requirement for redesign.

A principle object of the present invention is to provide apparatus and a method for sensing the magnitude and direction of an externally applied impact shock force and for making compensating adjustments in the spacing between the flying magnetic head and the juxtaposed magnetic media to prevent interference therebetween before the externally applied impact shock force has time to affect the spacing.

Another object of the present invention is to provide a simple and reliable impact shock sensing system.

Another object of the present invention is to provide a system for maintaining a flying magnetic head very close to a juxtaposed magnetic media to ensure maintenance of operation even though externally applied shock forces and vibration forces are imposed on the system.

In accordance with these and other objects of the present invention, there is provided an accelerometer or shock sensing means on the base or support for the rotating magnetic storage system. The magnetic storage system is isolated from the base through shock absorbers which attenuate, delay and damp the impact shock force. The magnitude and direction of the impact shock force is sensed by the sensing means and produces an analog output signal which is applied to a transducer. The transducer changes the forces operating between the flying head and the magnetic media in anticipation of the externally applied shock force disturbing the spacing or gap between the flying head and the magnetic media.

DESCRIPTION OF THE PREFERRED EMBODIMENT

Figure 1:
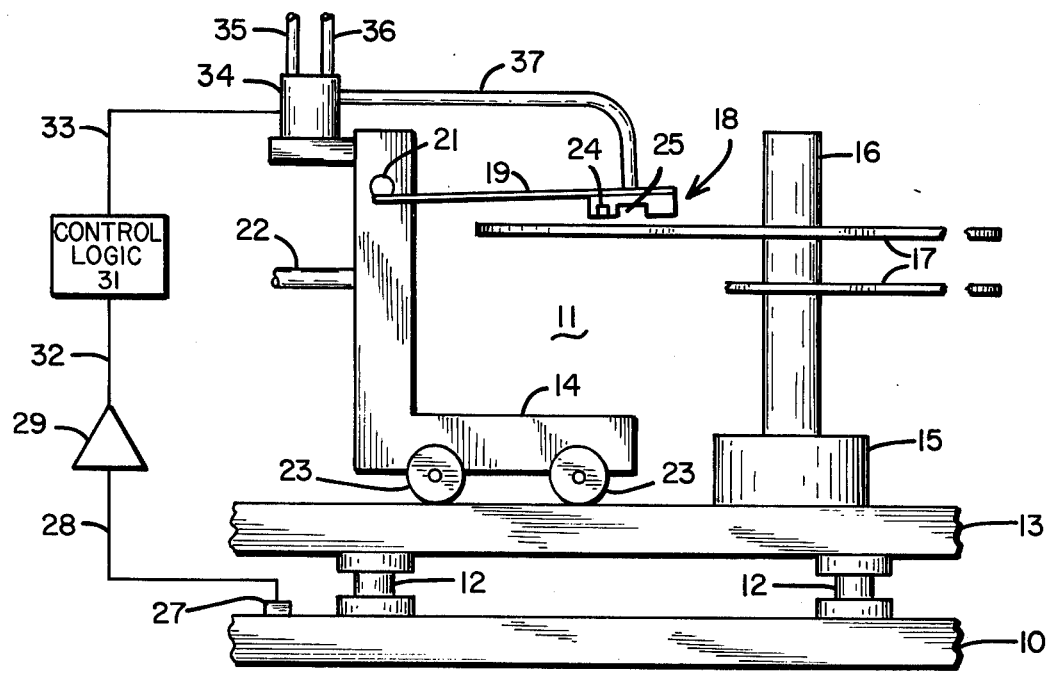
FIG. 1 is a pictorial and logic diagram representation of the present invention shock compensating system applied to a pneumatic flying head and a disk file memory system.

Refer to FIG. 1 showing a portion of a cabinet 10 which serves as a base supporting the shock compensating system 11. Shock absorbers 12 are mounted on base 10 and form the sole support for isolation of system 11. A fixed chassis 13 serves as a level support for movable head supporting carriage 14 and motor drive 15 which supports and rotates spindle 16 having a plurality of magnetic memory disk 17 thereon.

The memory disk 17 has a pluarlity of annular tracks or cylinders in which data may be stored or retrieved. Read-write head 18 is supported on flexible head support arm 19 which is mounted on beam 21 comprising a part of supporting carriage 14. The read-write head 18 is positioned over a desired annular track while the head 18 is in the elevated or raised position. The manner in which a head carriage 14 is positioned over a desired track by a linear motor is well-known and will not be discussed as a part of this invention. A connecting shaft 22 from the linear motor (not shown) and position encoder (not shown) moves the carriage 14 having roller bearings 23 or equivalent low friction guides.

After head 18 is positioned so that magnetic transducer 24 is over the desired track, the pressure in chamber 25 may be changed from a hydrodynamic pressure slightly above atmospheric to a pressure slightly below atmospheric causing the head 18 and transducer 24 to be lowered very close to the track on disk 17. In the preferred embodiment, a head of the type shown and disclosed in U.S. Pat. No. 3,913,138 may be employed to reduce the gap to between ten and twenty microinches. It is well-known that air gaps of this dimensions have advantages in producing higher read-back signals and enable the data to be recorded more densely on disk 17. A gap of 20 microinches has the disadvantage that particles of dust are larger than the air gap and severe undulations in the disk are likely to cause the head to touch the disk. Since it is desirable to locate transducer 24 as close to the magnetic film on disk 17 as possible to achieve high density magnetic recording the disk 17 for high density recording is not usually protected with thick plastic films.

The mass of head 18 may be less than one gram. The flexible head support arm 19 may have an effective mass as low as several ounces. The mass of the shock supported system 11 may be as high as 200 pounds in systems designed for shipboard use. When an external shock force is applied to the system the force produces a mass times acceleration reaction on the components which differs substantially between the rotating disk 17 and the head 18.

In a series of tests, a Model 7330 storage system made by Information Storage Systems of Cupertino, California, was subject to shock and vibration tests which reveal that vibrations between 5 and 500 cycles per second would cause the drive motor to resonate at lower frequencies than the disk pack assembly. Severe vibrations of the disk pack were observed at 110 cycles per second and under impact shock tests evidence indicates that the flying head 18 may have crashed into the disk 17 even though the heads on the test system were flying at a height in excess of forty microinches. The disk 17 did move in excess of 1-16th of an inch as the flying heads followed the undulations.

Selection of the proper shock absorbers for the mass of the system depends on the weight of the system and the frequency of vibration to be encountered. In the preferred embodiment system four Model 2K2 isolators made by Barry Wright Corporation, of Watertown, Mass., were employed. These shock absorbers substantially attenuated the shock forces, however, shock forces in excess of 300 times gravity imposed on the base 10 were sufficient to interrupt normal operation of the above-mentioned 7330 system.

Flying head 18 may be replaced with a test head which enables the gap between the test head and the disk to be continuously measured by a capacitive detection device. The results of vibration and shock forces applied to the base 10 may be recorded as oscilloscope patterns. It can be determined from the oscilloscope pattern when the flying heads are about to crash. The pressure in the chamber 25 of flying head 18 may be increased to avoid the anticipated crash. In a similar manner when the gap between disk 17 and head 18 increases, the pressure in chamber 25 may be decreased to prevent the head 18 from separating too far from the disk 17 to be continuously operable.

In the preferred embodiment, the data taken from actual shock and vibration tests may be employed in one of two modes of operation. In the first or simplest mode of operation when a disturbance is sensed that would interfere with proper operation of the system, the head 18 is moved away from the disk sufficiently to avoid any damage to the system. After the disturbance has ceased the head 18 may be lowered back to an operable position. Depending upon the severity of the shock applied to the base and carriage, the carriage may or may not be retracted in this first mode of operation.

In a second and more sophisticated mode of operation, the magnitude and direction of the shock force is sensed and is plotted or charted against the resulting change of gap between the head 18 and the disk 17. In this preferred embodiment system it was observed that the disturbance between the head and the disk occurred approximately 1 to 10 milliseconds after the shock force was applied to the base 10. The shock force is sensed and the output signal from the sensor is applied to a controller which changes the gap between the head 18 and the disk 17 in anticipation of the magnitude and direction of the interruption of the gap. In the continuously compensating system an accelerometer 27, mounted on base 10 receives the external impact shock force approximately one to ten milliseconds before the gap at the head is affected. The accelerometer measures the Z axis (vertical and normal to the head gap in FIG. 1) shock magnitude and produces an analog output signal on line 28 which is applied to amplifier 29 and fed to control logic 31. The input signal to control logic 31 is processed and shaped to provide the necessary signal on line 33 to cause pressure control valve 34 to regulate air from pressure line 35 and vacuum line 36 to produce the proper pressure in flexible hose 37 to raise or lower head 18 and produce the desired gap before the actual interruption would occur. The pressure applied to the head to prevent interruption may be checked by applying the corrected pressure under simulated conditions with the test head in position and measuring the gap with and without the compensation pressure applied.

It has been suggested that head 18 could be fitted with a gap sensing device and that the sensed gap signal could be employed as a feedback signal to continuously adjust control valve 34. Electronically sensing is fast enough to accomplish this result, however, the pneumatic or electromechanical compensation of the head gap is not fast enough to move the head away from the disk to avoid interruptions.

It has been suggested that a sensing head (not shown) like head 18 could be mounted upstream from head 18 to anticipate the shock force disturbance before reaching head 18. It has been found that the normal interrruption shock forces affect the whole disk pack at the same time or approximately the same time and sensing upstream from head 18 would not allow enough time to produce controlled changes.

Figure 2:
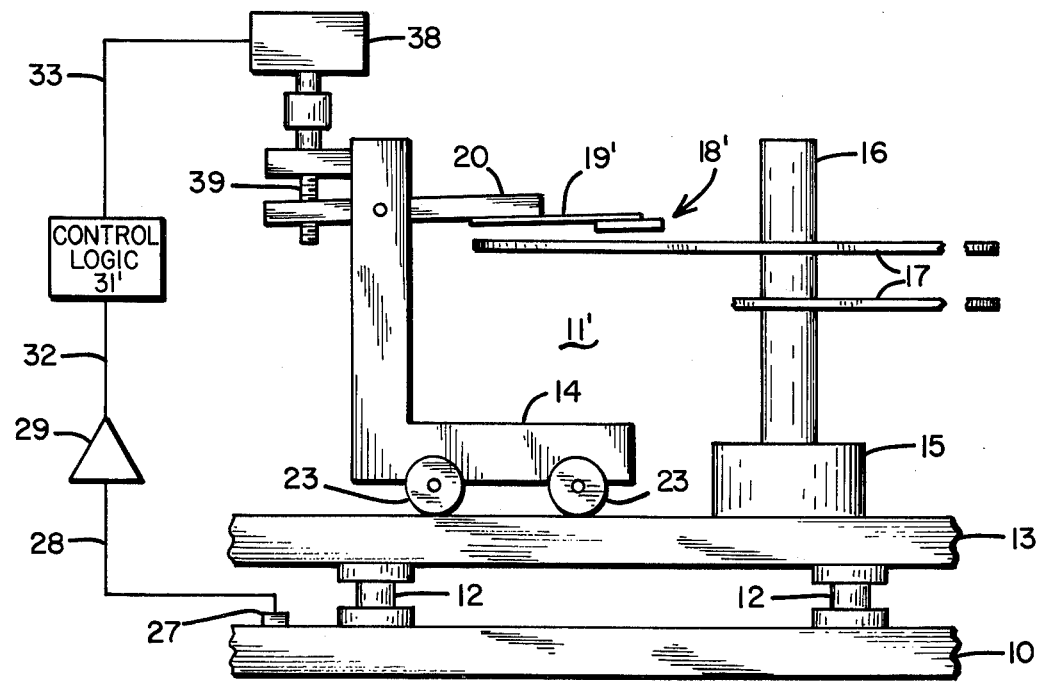
FIG. 2 is a pictorial and logic diagram representation of the present invention shock compensating system applied to an electromechanical servo adjusted flying head and a disk file memory system.

Refer to FIG. 2 showing a modification of the system of FIG. 1. In the modified system 11', the head support arm 19' is pivotally mounted on head support carriage 14 and provided with a lever arm 20 having one end extending in the opposite direction from the flying head. Head 18' is not provided with an air chamber 25. The gap between head 18' and disk 17 is determined by the downward force which is applied by lever 20 and arm 19. The force on lever 20 is supplied by servo motor 38 mounted on carriage 14. Servo motor 38 has a screw 39 mounted on its central shaft (not shown). Screw 39 is threaded into a bushing and lever arm 20 which causes head 18' to move up or down when screw 39 is rotated clockwise or counterclockwise.

Accelerometer 27 senses the magnitude of the Z direction shock force and generates a signal whih is applied at amplifier 29 and is logically shaped in control logic circuit 31 to produce the proper signal to rotate servo motor 38 and to adjust the gap at head 18' in anticipation of the disturbance being introduced by the external impact shock forces.

Each rotary storage device of the disk or drum type can be equipped with heads of the 18 or 18' type and can be supported by support arms of the 19 or 19' type. Further, the rotating magnetic storage device systems may have different masses. Once the mass and frequency of vibration to be encountered by the system is known the shock absorber can be selected so that it will damp and attenuate the most destructive frequency to be encountered by the system. In the preferred embodiment system described hereinbefore, the frequencies to be encountered did not exceed 500 Hz and non-linear shock absorbers having a ten to one attenuation factor at the low end of the frequency range were selected. When shock forces reached the limit of the shock absorbers the shock force reaching the system were attenuated and delayed the minimum amount. Each magnetic recording system may be isolated and measured in a controlled environment to achieve the optimum delay and attenuation.

Model 2222 accelerometer made by Endeyco of Pasadena, Calif., may be used in the system explained. The accelerometer may be mounted for sensing only the Z direction shock forces applied to base 10. The principle and mode of operation explained hereinbefore can also be applied to multiple axes of a magnetic recording system where multiple axis shock compensation is desired.

I claim:

1. A shock force compensating system for flying magnetic heads comprising:
   a stationary base subject to shock forces,
   a shock absorbing means on said stationary base for delaying shock forces several milliseconds,
   a chassis mounted on said shock absorbing means,
   a rotatable magnetic storage device mounted on said chassis,
   a flying head mounted on said chassis opposite said rotatable magnetic storage device for movement relative to said magnetic storage device,
   an accelerometer mounted on said stationary base for sensing shock forces and for immediately generating a signal indicative of the magnitude of said shock force,
   control means connected to said accelerometer for generating a control signal indicative of the magnitude of said shock force, and
   transducer means responsive to said control signal for moving said flying head relative to said magnetic storage device in anticipation of said shock force being transmitted to said chassis.

2. A shock force compensating system as set forth in claim 1 wherein said transducer means further comprises fluid valve means for regulating the pneumatic pressure of a gas being supplied to said flying head,
   said flying head further comprising a chamber connected to said regulated gas from said fluid valve for determining the height of said flying head from said magnetic media, and
   pneumatic pressure supply means comprising a vacuum line and a pressure line connected to said fluid valve means.

3. A shock force compensating system as set forth in claim 2 wherein said control means further comprises means for actuating said fluid valve means to control the pressure of the gas being supplied to said chamber in said flying head.

4. A shock force compensating system as set forth in claim 3 which further includes a head support carriage mounted on said chassis for linear movement relative thereto, and
   a head support arm mounted on said head support carriage for flexibly supporting said flying head.

5. A shock force compensating system as set forth in claim 1 which further includes,
   a support carriage mounted for linear movement on said chassis,
   a head support arm pivotally mounted on said head support carriage for supporting said flying head,
   said transducer means further comprising a rotary electric motor mounted on said head support carriage and adapted to move said head support arm in response to rotary movement of said electric motor, and
   said contol means being connected to said rotary electric motor to provide electrical signals for moving said electric motor in response to signals from said accelerometer.

6. a shock force compensating system as set forth in claim 5 wherein said electric motor comprises a high torque printed circuit motor.

7. A shock force compensating system as set forth in claim 6 wherein said printed circuit motor is provided with screw means cooperating with a threaded aperture on said head support arm.

8. A shock force compensated flying magnetic head system comprising:
   a stationary mounting base,
   shock absorbing means mounted on said stationary mounting base for absorbing and delaying transmitted shock forces several milliseconds,
   a chassis mounted on said shock absorbing means,
   magnetic media means mounted for rotational movement on said chassis,
   a head support carriage mounted for linear movement on said chassis,
   a head support arm mounted on said head support carriage for linear movement therewith,
   a flying head mounted on said head support arm for movement relative to said magnetic media means,
   an accelerometer mounted on said stationary mounting base for providing an immediate output signal indicative of the application of a shock force to said stationary mounting base, signal control means connected to the output signal of said accelerometer, pressure control means mounted on said head support carriage and actuated by said signal control means, air chamber means in said flying head means opposite said magnetic media means, and said air chamber means being connected to said pressure control means, whereby, a shock force applied to said accelerometer causes said pressure control means to raise or lower said flying head relative to said magnetic media in anticipation of said shock force being applied to said chassis.

9. A method of preventing flying heads from crashing into a juxtaposed rotatable magnetic media when an external shock force is applied to the cabinet which supports the magnetic media. and the flying heads comprising the steps of:

isolating said flying heads and said rotatable magnetic media from said cabinet by providing low frequency shock absorbers therebetween, p1 sensing the shock forces being applied to said cabinet, determining the magnitude of said shock force, generating a control signal when said shock force exceeds a predetermined level, attenuating and delaying said shock force being transmitted through said shock absorbers, applying said generated control signal to a transducer which positions said flying head juxtaposed said rotatable magnetic media, moving said flying head out of engagement with said rotatable magnetic media prior to said shock force being applied to said rotatable magnetic media and said flying head.

* * * * *

UNITED STATES PATENT AND TRADEMARK OFFICE
CERTIFICATE OF CORRECTION

PATENT NO. : 4,040,103
DATED : August 2, 1977
INVENTOR(S) : Robert A. White

It is certified that error appears in the above-identified patent and that said Letters Patent are hereby corrected as shown below:

Column 8, Line 1, "media. and" should be -- media and -- (period omitted).

Column 8, Lines 3, 4, 5 and 6:

"isolating said flying heads and said rotatable magnetic media from said cabinet by providing low frequency shock absorbers therebetween, pl sensing the shock forces being applied to said cabinet,"

should be

-- isolating said flying heads and said rotatable magnetic media from said cabinet by providing low frequency shock absorbers therebetween, sensing the shock forces being applied to said cabinet, --

("pl" omitted, and a paragraph between the words "therebetween," and "sensing.")

Signed and Sealed this

Eighteenth Day of October 1977

[SEAL]

Attest:

RUTH C. MASON
Attesting Officer

LUTRELLE F. PARKER
Acting Commissioner of Patents and Trademarks